United States Patent
Qian et al.

(10) Patent No.: US 9,785,486 B2
(45) Date of Patent: *Oct. 10, 2017

(54) METHODS FOR ENABLING AN APPLICATION WITHIN ANOTHER INDEPENDENT SYSTEM/APPLICATION IN MEDICAL IMAGING

(75) Inventors: Jianzhong Qian, Princeton Junction, NJ (US); Feng Ma, Pennington, NJ (US); Guo-Qing Wei, Plainsboro, NJ (US); Cheng-Chung Liang, West Windsor, NJ (US); Li Fan, Belle Mead, NJ (US); Xiaolan Zeng, Princeton, NJ (US)

(73) Assignee: EDDA TECHNOLOGY, INC., Princeton, NJ (US)

( * ) Notice: Subject to any disclaimer, the term of this patent is extended or adjusted under 35 U.S.C. 154(b) by 1011 days.

This patent is subject to a terminal disclaimer.

(21) Appl. No.: 11/785,413

(22) Filed: Apr. 17, 2007

(65) Prior Publication Data

US 2008/0005746 A1 Jan. 3, 2008

Related U.S. Application Data

(60) Provisional application No. 60/792,344, filed on Apr. 17, 2006.

(51) Int. Cl.
*G06F 9/44* (2006.01)
*G06F 9/54* (2006.01)
*G06F 9/48* (2006.01)

(52) U.S. Cl.
CPC ............ *G06F 9/542* (2013.01); *G06F 9/4843* (2013.01); *G06F 2209/482* (2013.01); *G06F 2209/544* (2013.01)

(58) Field of Classification Search
CPC .. G06F 9/542; G06F 9/4843; G06F 2209/482; G06F 2209/544
(Continued)

(56) References Cited

U.S. PATENT DOCUMENTS 5,978,590 A 11/1999 Imai et al.
2002/0016718 A1* 2/2002 Rothschild et al. .............. 705/2
(Continued)

FOREIGN PATENT DOCUMENTS

WO WO 2006/026650 A2 3/2006

OTHER PUBLICATIONS

Seagull Scientific BarTender Barcode Software; http://web.archive.org/web/20051217024826/http://www.racoindustries.com/seaintegrate.htm; 3 pages; retrieved Oct. 22, 2010; archived Dec. 17, 2005.*

(Continued)

*Primary Examiner* — H S Sough
*Assistant Examiner* — Kimberly Jordan
(74) *Attorney, Agent, or Firm* — Pillsbury Winthrop Shaw Pittman LLP

(57) ABSTRACT

A method and system is provided for data/process sharing. A trigger response unit is provided to reside on a first system where a first application system is present. The trigger response unit monitors, on the first system, when trigger data from a second application system is presented in the first application system. When the trigger data is presented in the first application system, the trigger response unit decodes the trigger data to obtain a trigger corresponding to a second application system. The obtained trigger is used to launch the second application system on the first system.

25 Claims, 8 Drawing Sheets

(58) Field of Classification Search
USPC .................................................. 719/313, 315
See application file for complete search history.

(56) References Cited

U.S. PATENT DOCUMENTS

| | | |
|---|---|---|
| 2005/0031181 A1 | 2/2005 | Bi et al. |
| 2005/0207658 A1 | 9/2005 | Schofield |
| 2007/0064987 A1* | 3/2007 | Esham et al. ................ 382/128 |

OTHER PUBLICATIONS

Joyce J. Nielsen; Microsoft Excel 97 quick reference; Mar. 1997; Chapter 9; 7 pages.*
Fogarty, Kevin; Gaffin, Adam; Microsoft's OLE can be network Trojan horse; Network World; Jun 27, 1994; vol. 11, No. 26; 2 pages.*
International Search Report and Written Opinion of the International Searching Authority, issued in Corresponding International Patent Application No. PCT/US2007/009344, dated on Dec. 19, 2007.
Matt Neuburg, "Apple Script; The Definitive Guide, 2nd Edition", Jan. 1, 2006, retrieved from the Internet: URL: http://proquest.safaribooksonline.com/0596102119>, retrieved on Dec. 7, 2007.
International Search Report and Written Opinion of the International Search Authority issued in International Patent Application No. PCT/US2009/051852, mailed Oct. 23, 2009.

* cited by examiner

METHODS FOR ENABLING AN APPLICATION WITHIN ANOTHER INDEPENDENT SYSTEM/APPLICATION IN MEDICAL IMAGING

CROSS REFERENCE TO RELATED APPLICATION

This application claims priority under 35 U.S.C. §119 from Provisional Patent Application No. 60/792,344, filed on Apr. 17, 2006. The entire subject matter of the application is incorporated herein by reference.

BACKGROUND

Technical Field

The present teaching relates generally to methods and system for process sharing between different system platforms. Specifically, the present teaching relates to methods and system for process sharing and communication between different medical imaging system platforms.

Discussion of Related Art

With the large number of applications available on computing devices, there is a need to allow these applications to share with each other data created in different applications. One conventional solution is through a set of interfaces such as Object Linking and Embedding (OLE) developed by Microsoft. Such interfaces can be used to facilitate creating a compound document, in which objects or data from different applications reside in a single document and such object or data may be manipulated in an environment similar to its native environment in which the objects or data are initially generated. This is possible because an application may be embedded within an object or data it creates and imported as an integrated object into a document operated by a different application so that the former application may be invoked to manipulate its object within the document when needed. For example, within a Microsoft Word document, one may incorporate a Microsoft Excel sheet embedded with the Microsoft Excel application. When the Word document is opened, one may invoke Microsoft Excel editing tool within the Word (for embedding) to process the incorporated Microsoft Excel spreadsheet.

In medical imaging, there is a similar need. A patient data processed in one application system such as a dedicated clinical application system (or a server based thereupon) may be imported into a different data processing environment and further being viewed and/or interactively manipulated using tools of the first application within the environment of the system to which the patient data is exported. As a specific example, a Computer-Aided Detection (CAD) system may process patient data to identify locations of suspicious regions for, e.g., tumors, and such identified locations may be exported, with possibly other associated data such as patient information and the original imaging data, to another medical imaging analysis application such as a Picture Archiving and Communication System (PACS) environment, which is physicians' routine reading environment. Within the PACS environment, the physicians may need to invoke the CAD application on the same patient data and to use the CAD system's interactive tools to further analyze the data.

Existing systems in medical imaging utilize certain commonly conformed standard in medical imaging such as Digital Imaging and Communication in Medicine (DICOM). To share images of different modalities, DICOM specifies how images should be stored and transferred. However, DICOM does not allow data to be embedded with application(s) that creates the data, making it difficult, if not impossible, to manipulate data created in one medical imaging system to be manipulated in its native environment in a different application system.

With the current technical limitations in medical imaging, to share the result data generated by an application among different medical imaging systems, there are two existing solutions. One is simply sending the result data created in a first application to a second application in a recognizable format such as DICOM for display in the second application and for manipulation using tools of the second application. With this solution, manipulation using data tools of the first application system in the environment of the second application system is not possible. The second solution is to integrate the first application system such as CAD system with the second application system such as PACS through some mutually defined APIs. In this case, implementing the API-based integration requires code-level engineering effort, which can be not only time consuming but also cost prohibitive. For example, considering the complexity of CAD systems and PACS systems on today's market, the effort to achieve such API-based integration can be very costly. This kind of integration is especially difficult if one considers integration with systems already installed in a clinical environment. Other dedicated clinical applications, such as 3D visualization, have similar restrictions in their accessibility within another independent system.

BRIEF DESCRIPTION OF THE DRAWINGS

The inventions claimed and/or described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

DETAILED DESCRIPTION

The present teaching is for providing process sharing and communication by encoding a graphic or symbolic representation of an application trigger as an image without the need for API or code-level integration between two systems.

Figure 1A:
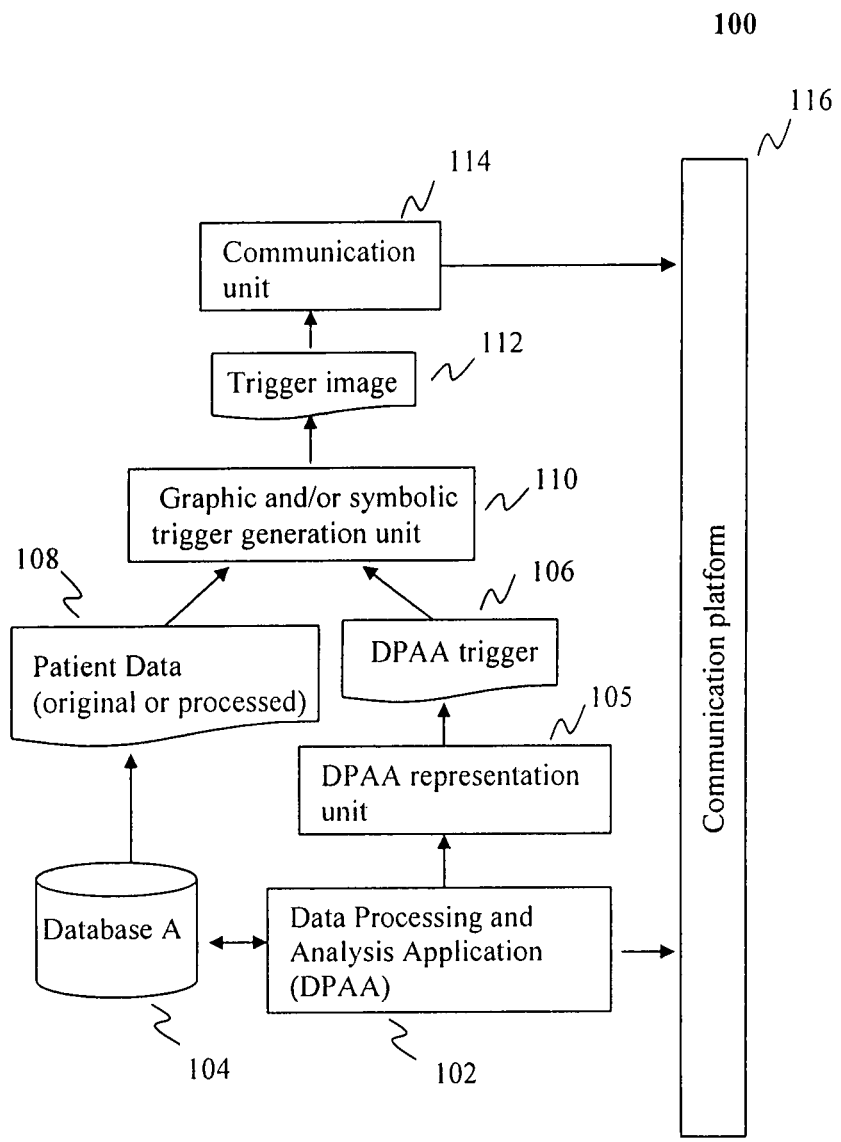
FIGS. 1a and 1b depict an exemplary construct of a system diagram for process sharing between two independent systems/applications, according to an embodiment of the present teaching.
Figure 1B:
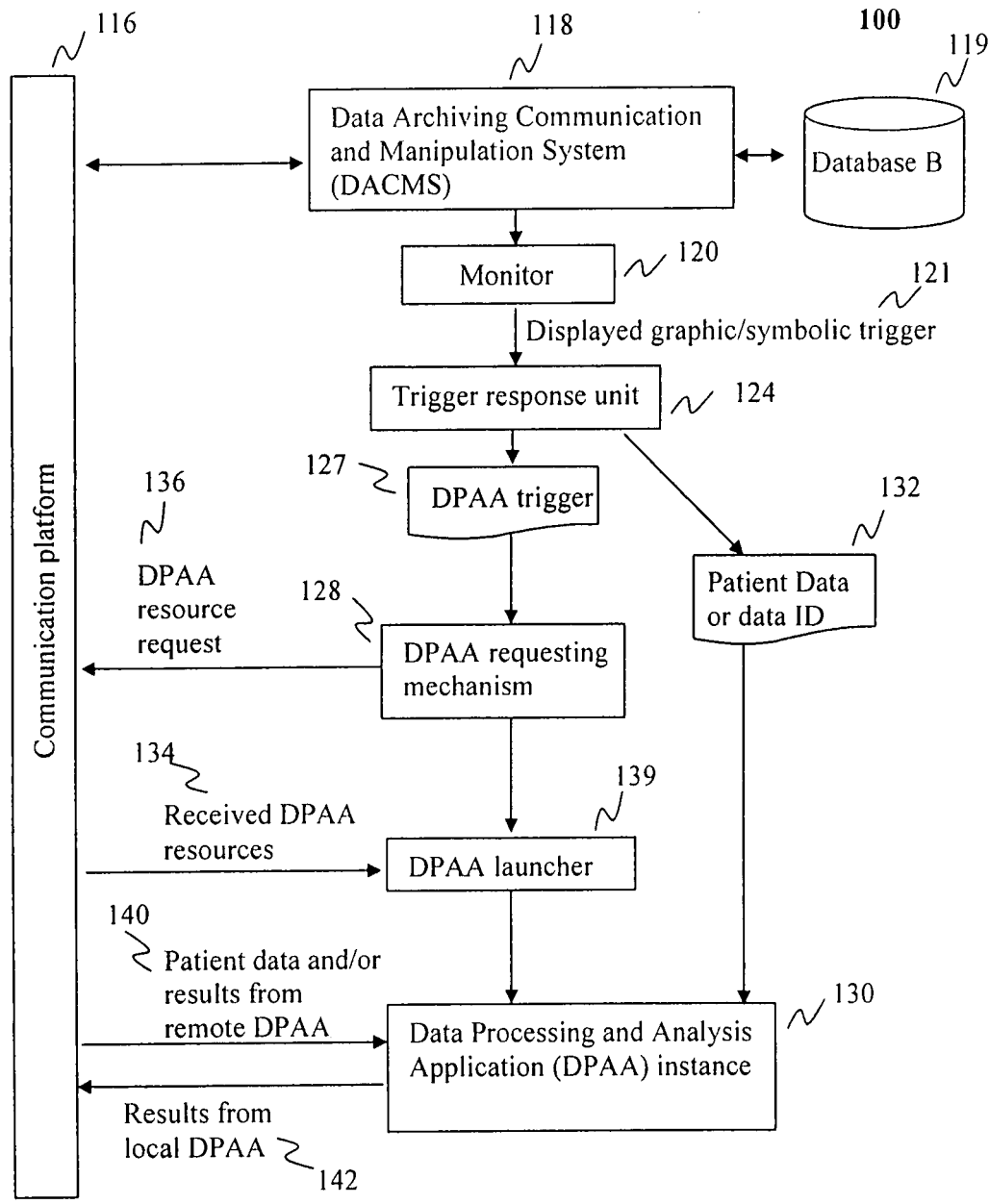

FIG. 1a and FIG. 1b show an exemplary system diagram 100 facilitating process communication and data/process sharing, according to an embodiment of the present teaching. The system 100 comprises two different applications or systems, one is on the left of the communication platform 116 corresponding to the first system and the other is on the right of the communication platform 116 corresponding to the second system. The two applications may or may not reside in separate computing devices. The system 100 comprises components of the first system including a Data Processing and Analysis Application (DPAA) unit 102, a DPAA representation unit 105, a graphic and symbolic trigger generation unit 110, a communication unit 114, a communication platform 116, and additionally all the parts residing on the second system, including a Data Archiving Communication and Manipulation System (DACMS) 118, a trigger response unit 124, a DPAA requesting mechanism 128, a DPAA launching unit 139, which creates an instance of DPAA 130. Each of the computing devices or systems comprises at least one processor.

The DPAA 102 may process patient data 108 from a data storage Database A 104. The Database A 104 may store both original patient data and processed result data. It may store data of different types, including, but not limited to, patient record, patient report, digital images, such as X-ray, CT, MRI, and results of data processing. The DPAA may be represented, through the DPAA representation unit 105, as a DPAA trigger 106. The DPAA trigger 106 may be in the form of a symbolic or numeric representation of the DPAA such as an abstraction in the form of an identification number to be used by the first system to identify DPAA or a physical location representing where the DPAA is stored. An example of such a symbolic representation of DPAA trigger is ABC. When there are a plurality of application systems to be shared within, e.g., DACMS, each identification number may be defined to uniquely identify a specific application system.

Figure 1C:
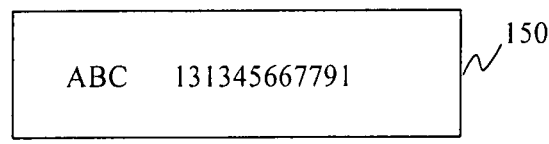
FIG. 1c shows an symbolic representation of DPAA trigger and patient data ID, according to an embodiment of the present teaching.
Figure 1D:
FIG. 1d shows an graphic representation of DPAA trigger and patient data ID as a barcode, according to an embodiment of the present teaching.

The graphic and/or symbolic trigger generation unit 110 may generate a trigger image 112 corresponding to the trigger containing a symbolic and/or graphic representation of the DPAA trigger 106 with associated patient data ID (identity). A symbolic representation is developed using symbols such as characters and numerals to compose a 2-dimensional image of such symbols. An example of a symbolic representation of DPAA trigger with associated patient data ID is shown in FIG. 1c, where the area 150 is the pixel data of the symbolic representation of the DPAA trigger, whereas characters ABC represents a DPAA trigger and numerals 131345667791 represents the associated patient data ID. In some embodiments, a graphic representation of DPAA trigger with associated patient data ID is a bar code. FIG. 1d illustrates a barcode representation of a DPAA trigger and the patient data ID. The area 160 is the pixel data representing barcode. The trigger image 112 generated by the trigger generation unit 110 may be either in the form of a patient data encapsulated with the graphic and/or symbolic representation for the DPAA trigger, or in the form of a separate DPAA trigger image containing the graphic and/or symbolic representation. When the trigger image 112 is exported via the communication unit 114 to the DACMS unit 118 via a communication platform 116, standardized protocols such as DICOM may be used to facilitate the transportation.

The DACMS 118 may be any system or application that may perform certain functions, including, but not limited to, data storage, data communication, data processing, and data visualization. An example of such a system is a Picture Archiving and Communicating System (PACS). The DACMS 118 may store the DPAA trigger data into a data storage Database B, 119. If DPAA 102 and DACMS 118 are located in different computers, the communication platform 116 may be either a local area network (LAN), or a wide area network (WAN) or other types of communication media. If the DPAA 102 and DACMS 118 are both located on the same computer, the communication platform 116 may include, but not limited to, specific hard drive locations or a specific network port number.

The trigger response unit 124 may be designed to correspond to a functional block of the first system such as the illustrated DPAA application system. The trigger response unit 124 is deployed within a foreign environment such as the second application system, e.g., the DACMS system, as shown in FIG. 1b. Once being deployed on the second system, the trigger response unit 124 monitors when a trigger image is displayed on a screen, e.g., monitor 120, in the foreign environment (e.g., DACMS). When the trigger image is displayed, e.g., upon a physicians' selection, on a monitor 120, the trigger response unit 124 detects the presence of the graphic and/or symbolic representation of DPAA trigger with associated patient data ID from the screen, and extracts or decodes both the DPAA trigger 127 and the patient data or data ID 132 from the displayed graphic and/or symbolic representation 121.

The trigger response unit 124 may need to be pre-loaded in the second system or the environment, prior to the second application system such as DACMS starts to import the trigger data from the first application system such as DPAA The deployment of the trigger response unit 124 may be through a direct installation, download, or deployment from DPAA 102. Based upon the extracted DPAA trigger 127, the DPAA requesting mechanism 128 may send a DPAA resource request 136 to the communication platform 116. The DPAA source request may incorporate the decoded DPAA trigger which, upon being received by the first system, can be used by the first system to instantiate an instance of the DPAA and the DPAA launcher 139 may then launch such created instance of DPAA 130 in the DACMS environment.

The DPAA launcher 139 may be an independent program running in the backend in the DACMS environment. When an instance of DPAA 130 is launched, the activated DPAA instance may then be used to manipulate the patient data imported from the first application system or DPAA 140. If additional analysis results are subsequently generated by the original first DPAA, the launched DPAA in the foreign environment may send a request for the results to be sent to the launched DPAA 130. The communications between the original DPAA and the launched DPAA in the foreign environment may be based on the patient data ID 132.

On the other hand, if some information needed by the launched DPAA is not present in the trigger image, the launched DPAA may request such information from either the original DPAA 102 residing on the first system or from DACMS 118 through some standard interfaces, such as DICOM. In this way, both DACMS and DPAA can operate on the same patient data. The processed results 142 from the launched DPAA on the second system may also be sent to DACMS 118 and remote DPAA 102 via the communication platform 116.

Figure 2:
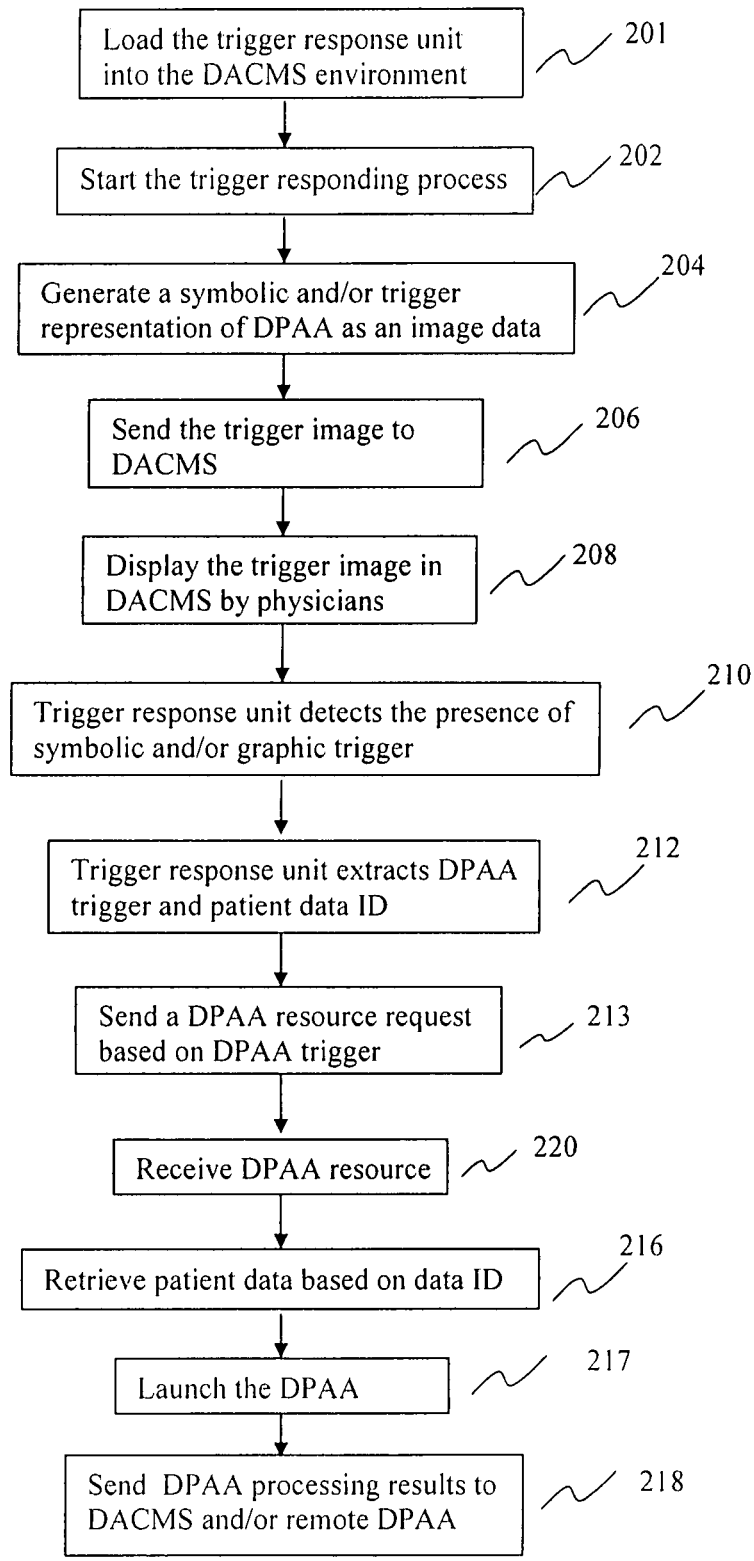
FIG. 2 shows a flowchart of process communication and process sharing between multiple systems/applications, according to an embodiment of the present teaching.

FIG. 2 illustrates an exemplary workflow of the system 100, according to one embodiment of the present teaching. At step 201, the trigger response unit 124 may be deployed in the DACMS environment, either remotely from the DPAA environment or through local installation. Upon being deployed in the DACMS environment, the trigger response unit may then start to monitor when a trigger image created by a DPAA system is displayed in the DACMS environment, step 202. It may check for the existence of a graphic and/or symbolic pattern on a display screen. Such checking may be performed within a memory, in which the DACMS program may reside and operate. The check may also be performed in a buffer that stores data to be displayed. The memory may include video memory.

After the trigger response unit 124 is deployed in a foreign environment, the process/data sharing may be facilitated in the following steps. At step 204, the trigger generation unit may generate a trigger image containing a graphic and/or symbolic representation of the DPAA trigger 106. At step 206, the trigger image may be sent to the DACMS 118 by the communication unit 114. At step 208, physicians open the trigger image and displays it on the screen in DACMS. When the trigger image is displayed in the DACMS environment, the trigger response unit 124 detects the presence of the graphic and/or symbolic pattern and extracts the DPAA trigger and patient data ID at step 210, e.g., by a process running on the backend in DACMS environment. At step 213, a request for DPAA resources is generated based on the DPAA trigger extracted in step 212 and sent to the original DPAA. Upon receiving the DPAA resource request, the original DPAA 102 responds to the request by sending the requested DPAA resources at step 220

At step 216, the patient data may be retrieved from the remote DPAA 102, based on the extracted data ID. When DPAA components and the patient data are available, a DPAA instance may be instantiated and launched at step 217. At step 218, the processed results from the launched DPAA may be sent to DACMS or to the original DPAA.

Figure 3A:
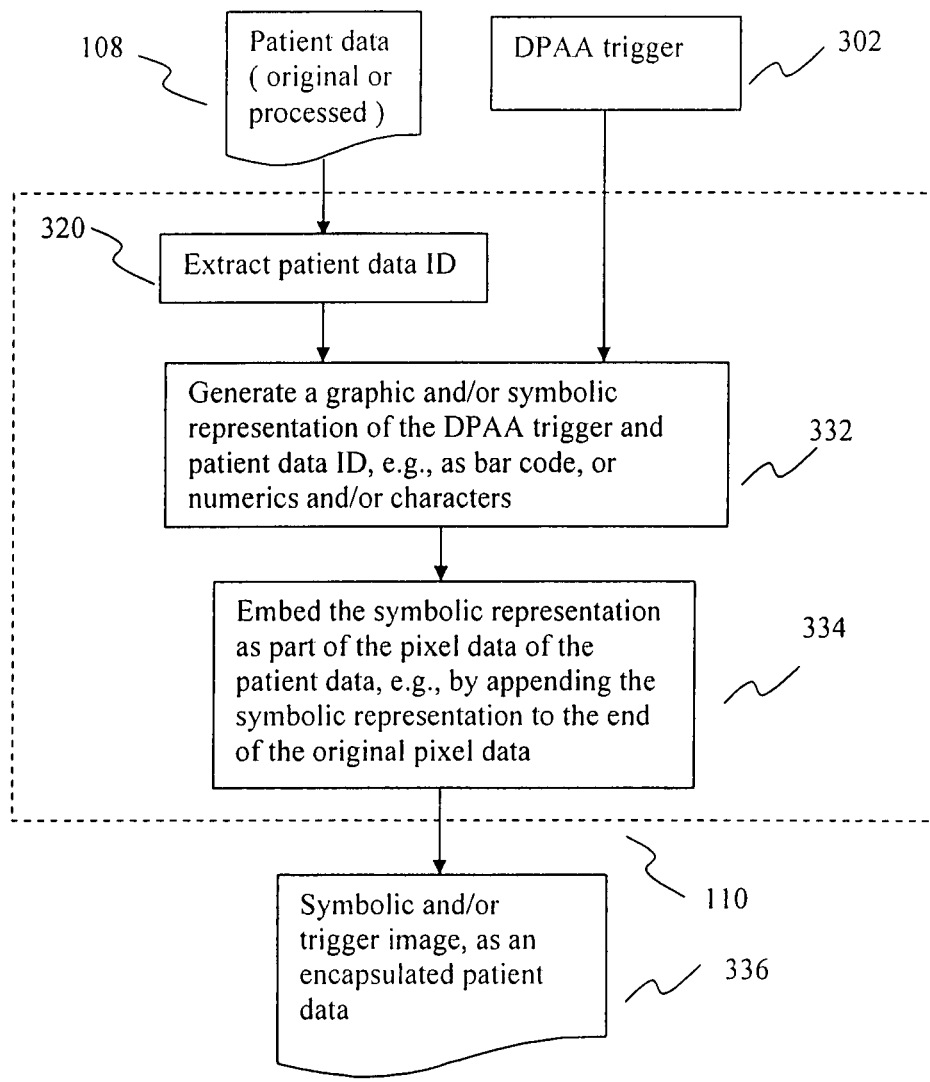
FIG. 3a is an exemplary flow of encapsulating a symbolic and/or graphic representation for DPAA trigger and patient data ID with the patient data.
Figure 3B:
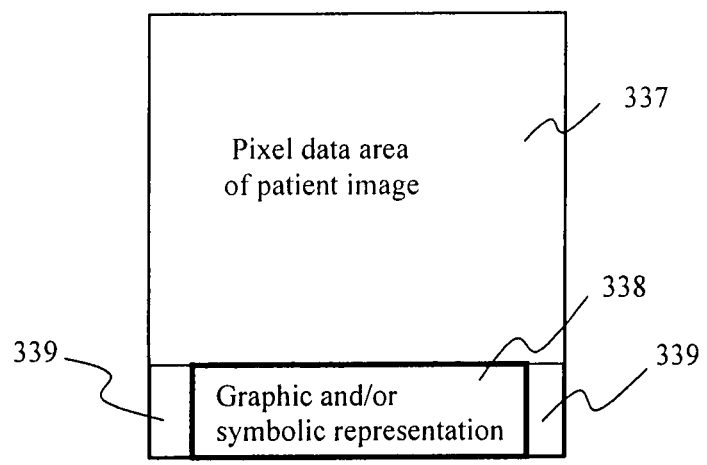
FIG. 3b illustrates how a graphic and/or symbolic representation of DPAA trigger and patient data ID can be appended to a patient image.
Figure 3C:
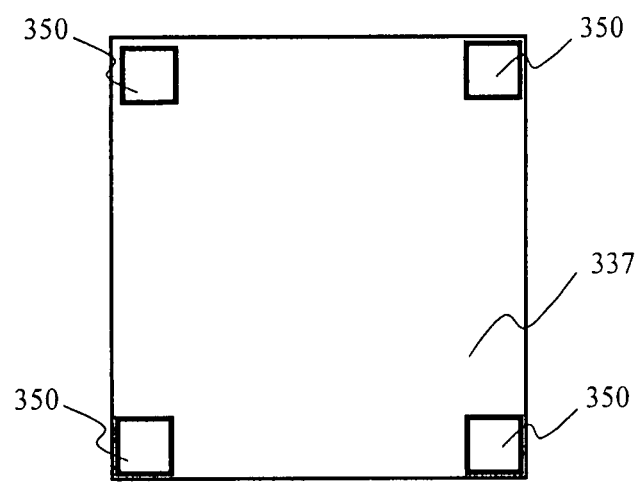
FIG. 3c illustrates how a graphic and/or symbolic representation of DPAA trigger and patient data ID can be appended into one or more corners of a patient image.
Figure 3D:
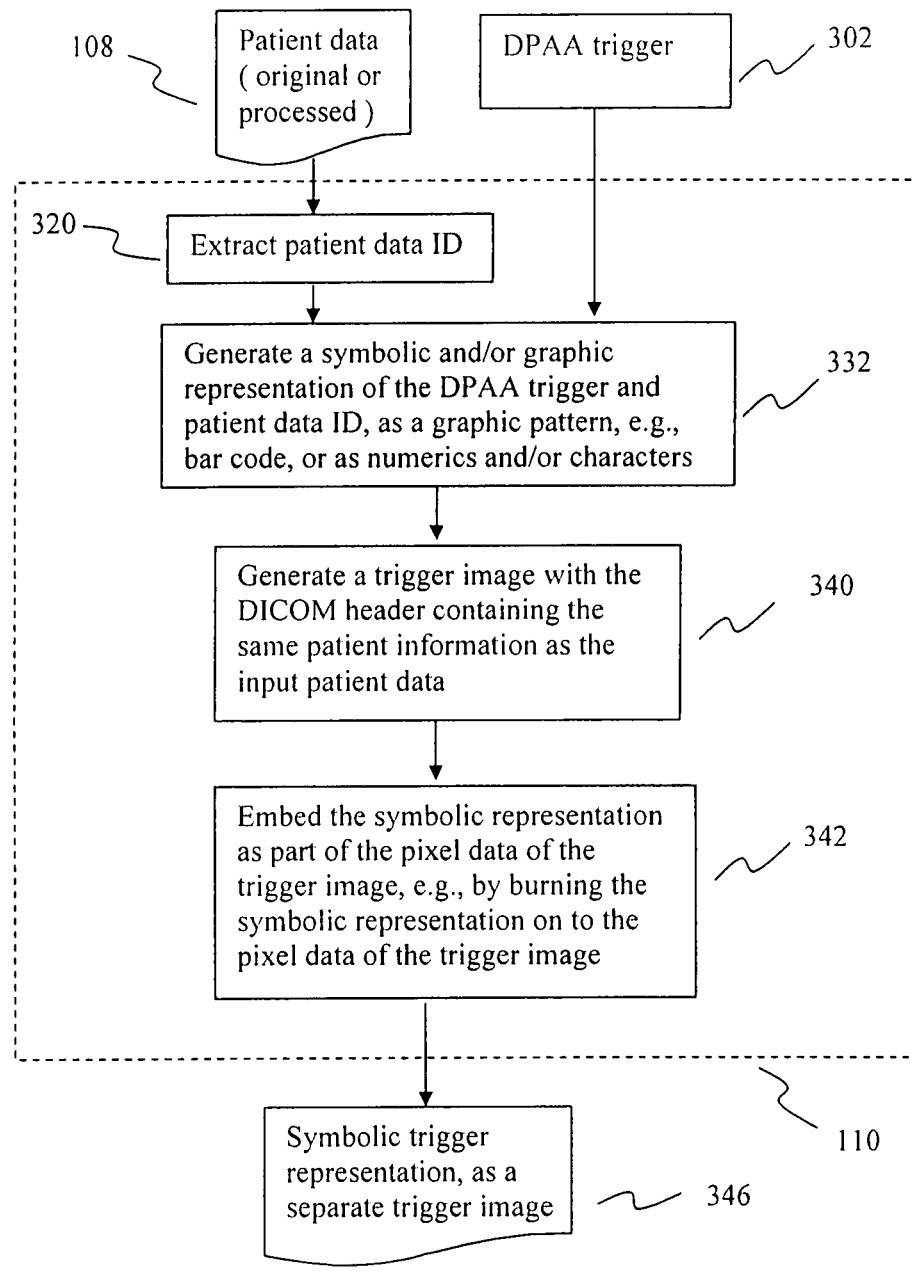
FIG. 3d shows an exemplary embodiment of generating a graphic and/or symbolic trigger data by putting a graphic and/or symbolic representation of DPAA trigger and patient data ID into an additional trigger image.

FIG. 3a is an exemplary flowchart of graphic and/or symbolic trigger generation according to an embodiment of the present teaching. At step 320, the patient data ID may be extracted from the patient data. An embodiment is to extract the SOP (Service Object Pair) instance UID (Unique Identifier) from the DICOM header of the patient data. The SOP instance UID is designed by the DICOM standard to uniquely identify a patient image. At step 332, the DPAA trigger and patient data ID may be encoded as a graphic and/or symbolic graphic pattern. An embodiment of such a graphic pattern is a barcode, as illustrated in FIG. 1d. The barcode may be either in 1-dimensional or 2-dimensional. In some embodiments a symbolic representation of a DPAA trigger with associated patient data ID can be encapsulated in corresponding patient data by superimposing the symbolic representation (e.g., characters of numerals) on image areas, as illustrated in FIG. 1c. At step 334, the graphical and/or symbolic representation of the DPAA trigger and patient data ID may be incorporated into the pixel data field of the patient data. In some embodiments, the symbolic representation of the trigger with associated ID may be appended to the pixel data of the patient image. FIG. 3b illustrates an example, where area 337 represents the pixel data of the patient image, area 338 represents the graphic and/or symbolic representation of a DPAA trigger. For example, to append area 338 to the end of area 337, the area 338 has to be extended by area 339 by filling a certain pixel value to make the width of graphic representation the same as the patient image. Since the height of the patient image is increased, the DICOM header regarding image height needs to be modified to reflect the new image height. Another embodiment is to incorporate the graphic and/or symbolic representation into the pixel data of the patient image, such as into the corner or boundary pixels of the patient image. FIG. 3c shows an example, where a graphic and/or symbolic representation of DPAA and patient data ID is split into 4 part and put into the 4 corners 350 of the pixel data area 337 of the patient image. The original pixel data at the 4 corners 350 may be overwritten or combined with encoded trigger in some predetermined manner. The output is a trigger image 336 that contains both the original image data and the graphic and/or symbolic trigger representation of DPAA and patient data ID FIG. 3d is another exemplary flowchart of the graphic and/or symbolic trigger generation unit according to an embodiment of the present teaching. At step 320, the patient data ID may be extracted from the patient data, similarly to the one described in FIG. 3a. At step 332, the DPAA trigger 302 and patient data ID may be encoded as a graphic or symbolic representation, similarly to the one described in FIG. 3a. At step 340, an independent trigger image may be created, with the DICOM header containing the same patient information as that of the original patient data. At step 342, the symbolic and/or graphical representation of the DPAA trigger with associated patient data ID may be put into the pixel data field of that trigger image. The output is a separate trigger image 346 that contains the graphic and/or symbolic representation of the DPAA and patient data ID.

Since the trigger image data contains the same patient information as the original image, it may be organized under the same patient into the data storage unit 120 by the DACMS 118, according to the DICOM protocol.

Figure 4:
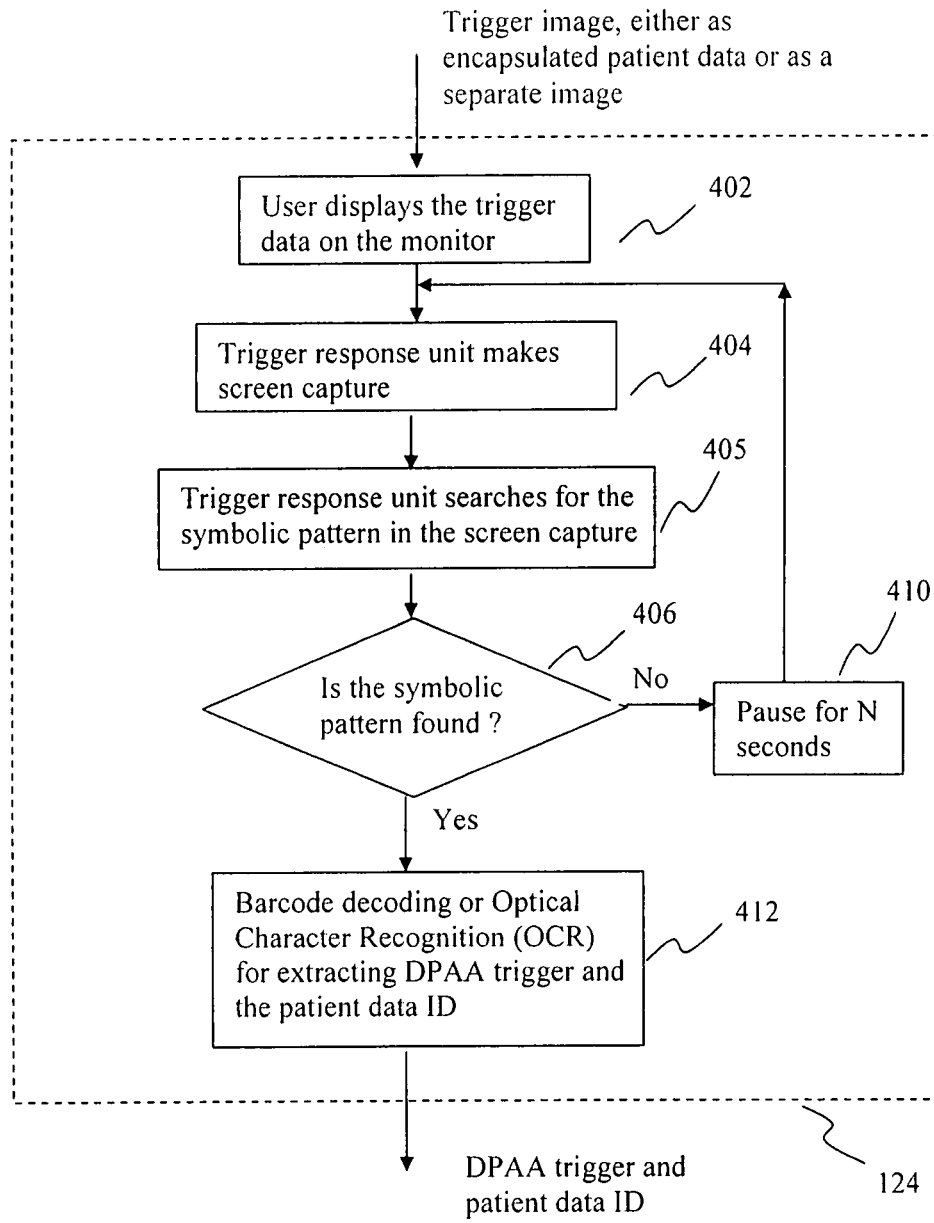
FIG. 4 is an exemplary embodiment of a trigger response unit for extracting a DPAA trigger and associated patient data ID from displayed graphic and symbolic trigger.

FIG. 4 shows an exemplary flow of the trigger response unit 124. At step 402, a user selects to display trigger image in the environment of DACMS 118. The trigger image may either be a patient image encapsulated with the trigger, or an image containing only the symbolic representation of a DPAA trigger with associated patient data ID. Depending on the implementation of DACMS, the selection may be performed either by double-clicking a thumbnail of the trigger image, or by clicking an entry in the image list of the patient data.

The previously deployed trigger response unit, running in the backend of the DACMS environment, may make screen captures of the display monitor, at step 404. The capture may be performed at sampled screen locations. At step 405, the captured regions may then be analyzed to identify whether the graphic and/or symbolic pattern is present on the screen. If it is determined, at step 406, that no symbolic pattern is present, the trigger response unit may pause for a certain time interval at step 410 and subsequently capture another screen capture to search for the symbolic and/or graphic pattern. If the expected symbolic pattern is captured and identified it may then be analyzed so that the DPAA trigger and patient data ID can be decoded and extracted, at step 412. Depending on how the trigger is generated, barcode decoding techniques or optical character recognition (OCR) techniques known in the art may be used for extracting the DPAA trigger and the patient data ID.

While the inventions have been described with reference to the certain illustrated embodiments, the words that have been used herein are words of description, rather than words of limitation. Changes may be made, within the purview of the appended claims, without departing from the scope and spirit of the invention in its aspects. Although the inventions have been described herein with reference to particular structures, acts, and materials, the invention is not to be limited to the particulars disclosed, but rather can be embodied in a wide variety of forms, some of which may be quite different from those of the disclosed embodiments, and extends to all equivalent structures, acts, and, materials, such as are within the scope of the appended claims.

We claim:

1. A method implemented on at least one computer system, each of which has at least one processor, storage, and a communication platform for data/process sharing, comprising the steps of:
   providing a trigger response unit residing on a first computer system where a first application resides;
   in response to an input from a user, displaying a trigger image in the first application on the first computer system;
   automatically capturing, by the trigger response unit without human intervention, at least part of the displayed trigger image;
   automatically analyzing, by the trigger response unit without human intervention, the captured part of the displayed trigger image to visually determine whether a graphic pattern is present on a display screen;
   if the graphic pattern is determined to be present on the display screen, decoding, by the trigger response unit, the graphic pattern to obtain a trigger with associated data, the trigger being a representation of a second application residing on a second computer system; and
   automatically launching the second application on the first computer system based on the trigger with the associated data, wherein
   the first application and the second application do not have a common application interface that facilitates launching of the second application.

2. The method according to claim 1, wherein the trigger response unit is downloaded from the second computer system to the first computer system.

3. The method according to claim 1, wherein the trigger response unit is provided by a third computer system.

4. The method according to claim 1, wherein the trigger represents one of a full version of the second application, a partial version of the second application, an identifier corresponding to the second application that is recognizable on the second computer system, and an location indicator corresponding to where the second application resides on the second computer system.

5. The method according to claim 1, wherein the launching the second application, when the trigger represents a full version of the second application, comprises:
   instantiating an instance of the second application on the first computer system; and
   launching the instance of the second application on the processor of the first computer system.

6. The method according to claim 1, wherein the launching the second application, when the trigger represents a partial version of the second application, comprises:
   sending, via the communication platform of the first computer system, a resource request to the second computer system for a full version of the second application based on the trigger;
   receiving, via the communication platform of the first computer system, an indication from the second computer system regarding receiving the requested full version of the second application;
   instantiating, on the first computer system, an instance of the second application on the first computer system; and
   launching the instance of the second application on the processor of the first computer system.

7. The method according to claim 1, wherein the graphic pattern is a bar code coding the trigger with the associated data.

8. The method according to claim 1, wherein the graphic pattern is an image for one or more numerical symbols corresponding to the trigger with the associated data.

9. The method according to claim 8, wherein the graphic pattern is coded with a data set corresponding to the associated data generated by the second application.

10. The method according to claim 9, wherein the graphic pattern is superimposed in the data set.

11. The method according to claim 1, further comprising encoding, on the second computer system, data from the second application and the trigger to generate the trigger image.

12. The method according to claim 10, wherein the graphic pattern is superimposed at a pre-defined location of the data set.

13. The method according to claim 12, wherein the decoding comprises:
   identifying the pre-defined location of the data set, by the processor of the first computer system; and
   extracting the trigger from the pre-defined location of the data set, by the processor of the first computer system.

14. The method according to claim 12, wherein the decoding comprises:
   searching for a location in the data set where the graphic pattern is present, by the processor of the first computer system;
   analyzing, by the processor of the first computer system, information from the location in the data set; and
   retrieving, in the memory of the second computer system, the trigger based on the analysis result.

15. The method according to claim 1, wherein each of the first computer system and the second computer system is part of a same computing system.

16. The method of claim 1, wherein the part of the captured trigger image includes the bottom of the trigger image.

17. The method of claim 1, wherein the part of the captured trigger image includes one or more corners of the image.

18. The method of claim 1, wherein the trigger response unit continuously runs in the backend of first computer system to capture at least part of the displayed trigger image and determine whether a graphic pattern of the captured part of the displayed trigger image is present on a screen in a time interval.

19. A system for data/process sharing having a first computer system and a second computer system, the system comprising:
   a first application implemented on the first computer system having a first processor, storage, communication platform, and a display configured to, in response to an input from a user, display a trigger image in the first application;
   a second application implemented on the second computer system having a second processor, storage and communication platform;

a trigger response unit implemented on the first computer system configured to:
    automatically capture at least part of the displayed trigger image without human intervention,
    automatically analyze the captured part of the displayed trigger image without human intervention to visually determine whether a graphic pattern is present on a display screen, and
    if the graphic pattern is determined to be present on the display screen, decode the graphic pattern to obtain a trigger with associated data, the trigger being a representation of the second application residing on the second computer system;
a symbolic trigger generation unit implemented on the second computer system configured to encode data from the second computer system with the trigger; and
a launcher implemented on the first computer system configured to automatically launch the second application on the first computer system based on the trigger with the associated data, wherein
the first application and the second application do not have a common application interface that facilitates launching of the second application.

20. The system according to claim 19, wherein the trigger response unit is downloaded or deployed from the second computer system to the first computer system.

21. The system according to claim 19, wherein the trigger response unit is provided by a third computer system.

22. The system according to claim 19, wherein the symbolic trigger generation unit embeds the graphic pattern into a pre-defined location of the trigger image.

23. The system according to claim 19, wherein the trigger represents one of a full version of the second application, a partial version of the second application, an identifier corresponding to the second application that is recognizable on the second computer system, and an location indicator corresponding to where the second application resides on the second computer system.

24. The system according to claim 19, further comprising a requesting mechanism residing on the first computer system, wherein the requesting mechanism sends a request to the second computer system to obtain resources relating to the second application when the trigger does not include a full version of the second application.

25. The system according to claim 24, wherein the requesting mechanism sends a request to the second computer system to obtain information that is not present in the data.

* * * * *